United States Patent [19]

Cloeren

[11] Patent Number: 4,789,513
[45] Date of Patent: Dec. 6, 1988

[54] COEXTRUSION APPARATUS AND PROCESS

[75] Inventor: Peter F. Cloeren, Orange, Tex.

[73] Assignee: P.C.E. Corp., Orange, Tex.

[21] Appl. No.: 59,102

[22] Filed: Jun. 5, 1987

[51] Int. Cl.$^4$ .............................................. B29C 47/70
[52] U.S. Cl. .................... 264/171; 264/40.7; 425/131.1; 425/133.5; 425/462
[58] Field of Search ............ 264/171, 40.7, 37, 173, 264/514–515, 176.1; 425/131.1, 376 A, 133.5, 462

[56] References Cited

U.S. PATENT DOCUMENTS

| 3,315,306 | 4/1967 | Ladner et al. | 425/133.5 |
|---|---|---|---|
| 3,397,428 | 8/1968 | Donald. | |
| 3,479,425 | 11/1969 | Lefevre et al.. | |
| 3,511,903 | 5/1970 | Glass et al. | 264/173 |
| 3,761,211 | 9/1973 | Parkinson | 425/462 |
| 3,860,372 | 1/1975 | Newman, Jr.. | |
| 4,197,069 | 4/1980 | Cloeren. | |
| 4,533,308 | 8/1985 | Cloeren | 425/133.5 |
| 4,533,510 | 8/1985 | Nissel | 425/133.5 |

FOREIGN PATENT DOCUMENTS 55-28825  2/1980  Japan.

OTHER PUBLICATIONS

Photograph of 7-Layer, Dual Plane Coextrusion Feedback Having Vane Blades with Undercut Wall, of Cloeren Company.

*Primary Examiner*—Jeffery Thurlow
*Attorney, Agent, or Firm*—Timothy R. Kroboth

[57] ABSTRACT

The present invention provides a novel coextrusion apparatus including, in a preferred embodiment, a die within a feedblock. The apparatus includes edge seam-forming channels, which provide a core layer sandwiched within adjacent layers having integrally seamed edges. Also provided in a unique process for sandwiching a core stream within adjacent layers.

17 Claims, 3 Drawing Sheets

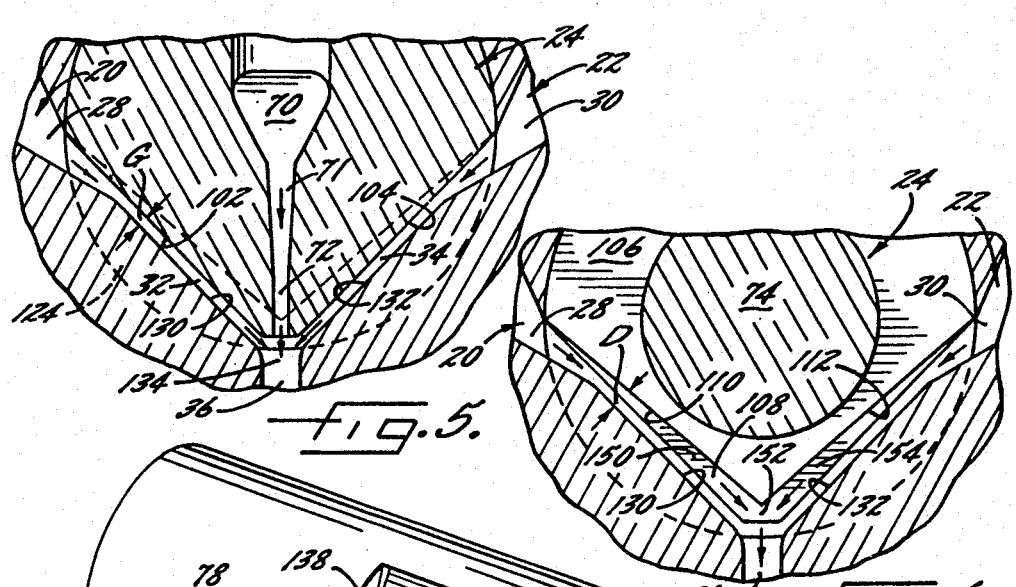
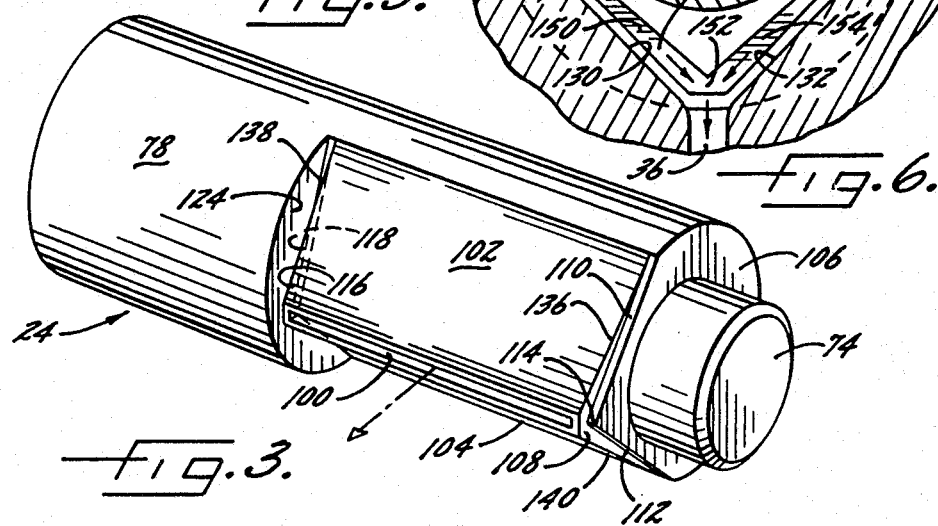
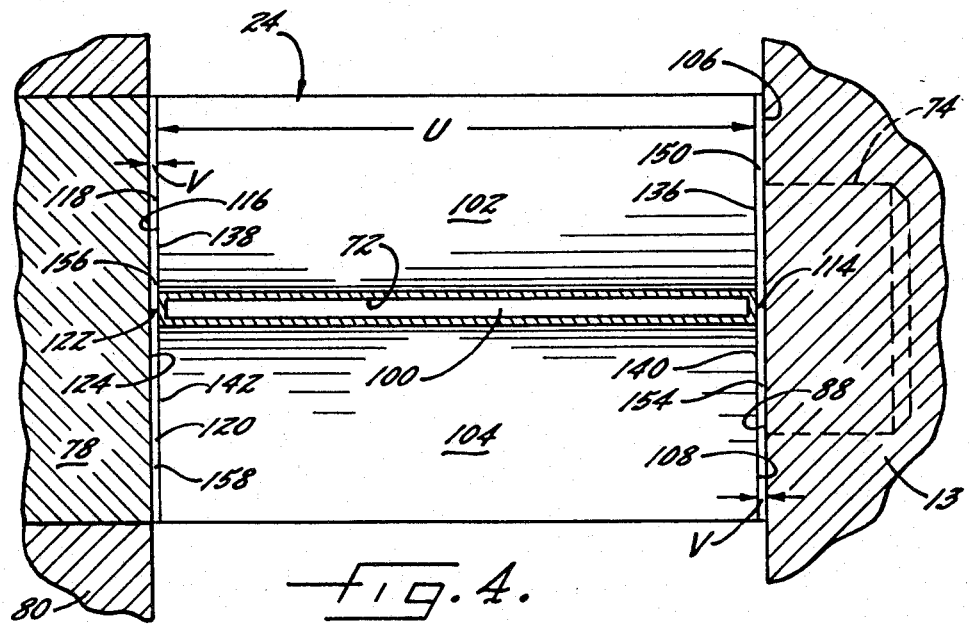

COEXTRUSION APPARATUS AND PROCESS

TECHNICAL FIELD

This invention relates to coextrusion, particularly of heat-sensitive or corrosive materials, especially certain thermoplastic compositions such as polyvinylidene chloride and ethylene vinyl alcohol.

BACKGROUND ART

As illustrated by U.S. Pat. No. 4,197,069 to Cloeren, an extrusion apparatus having an adjustable vane blade between flow channels, is known. The adjustable blade provides for stream convergence at substantially equal flow velocities.

As exemplified by U.S. Pat. Nos. 3,397,428 to Donald, 3,479,425 to Lefevre et al, and 3,860,372 to Newman, Jr., encapsulation of a core stream is known. Japanese Patent Document No. 55/28825 illustrates a multimanifold die that, as shown in FIG. 7 thereof, is able to produce a core layer sandwiched within an upper layer and a lower layer.

Also known is a coextrusion apparatus characterized by a removable die within a feedblock. The die is rigidly mounted between a first flow channel and a second flow channel. A core stream exiting from the die is sandwiched within streams from these flow channels.

Pivotably mounted between the first flow channel and a third flow channel of the coextrusion apparatus is an adjustable vane blade. Likewise, between the second flow channel and a fourth flow channel is another pivotably mounted, adjustable vane blade. An end of each vane blade has an undercut wall.

Each flow channel includes a tapered flow-restriction channel. As in U.S. Pat. No. 4,197,069, by adjustment of flow-restriction channel width through radial movement of a vane blade point end, the apparatus provides for the convergence of streams at substantially equal flow velocities.

Adjacent to the tip of each vane blade is a removably mounted, adjustable distribution pin. The pin is externally accessible for adjustment. Cooperation of a distribution pin with the adjacent vane blade tip, provides, if needed, for the profiling of a stream as it exits from its flow channel.

Profiling results in each layer of a laminate product having a substantially uniform widthwise cross-section. In the profiling process, the cross-sectional configuration of a stream, viewed perpendicular to the flow-direction, is transformed from a rectangular shape to a shape that is changed back to the original rectangular shape as a melt-laminate formed from converging streams, passes through a downstream die manifold.

A drawback of the coextrusion apparatus is that it does not consistently prevent lateral leakage of the core stream. As a result, a slight material degradation, observed as a discoloration with a hermally unstable polymer, sometimes occurs at the edges of a thermally unstable polymer core layer.

A further drawback is that the presence of streams on both sides of an adjustable vane blade, affords a complex flow control situation. As a result, it may be difficult for an operator to determine the necessary blade adjustment.

Furthermore, situations will arise where the streams on each side of a vane blade have opposing needs. For example, there should be a constant proportionality between the output from the first and second channels, and the die output. However, if, for instance, there should be a turbulent flow in the third flow channel, a vane blade adjustment to eliminatethe turbulent flow, would destroy the proportionality. Moreover, the resulting disproportionality could allow lateral leakage of the core stream.

Therefore, there is a need for an improved coextrusion apparatus that consistently prevents lateral leakage of a core stream. Such an apparatus would provide an even greater contribution to the coextrusion art if it simplified and improved flow control. Moreover, such an apparatus would make possible an improved coextrusion process for isolating a core stream.

DISCLOSURE OF THE INVENTION

It is accordingly an object of the present invention to provide an improved coextrusion apparatus that consistently prevents lateral leakage of a core stream.

It is a further object of the present invention to provide an improved coextrusion apparatus that produces a core layer free of degradation.

It is a still further object to provide an improved coextrusion apparatus that has simplified and improved flow control.

It is an even further object to provide an improved coextrusion process for isolating a core stream.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an improved coextrusion apparatus. A main body of the apparatus includes a first flow channel and a second flow channel. The first and second flow channels each include a land channel.

The apparatus further includes a die disposed between the first flow channel and second flow channel. The main body of the apparatus has a wall which cooperates with a face of the die to form the land channel of the first flow channel, and has another wall which cooperates with an opposite face of the die to form the land channel of the second flow channel.

The apparatus further includes a pair of edge seam-forming channels at each end of, and in fluid communication, with the land channels. Each pair of edge seam-forming channels converges at a locus of convergence located upstream of a place of convergence of the land channels and an exit channel of the die.

Also provided is a coextrusion process for sandwiching a core stream within adjacent layers. The process includes converging a core stream with a first and a second stream. In the process, edges of the first and second streams are converged prior to convergence of the core stream and the first and second streams. As a result, seamed edges that prevent lateral leakage of the core stream, are formed.

In the drawing and in the detailed description of the invention that follows, there are shown and essentially described only preferred embodiments of this invention, simply by way of illustration of the best mode contemplated by me of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an improved coextrusion apparatus in accordance with the present invention.

FIG. 3 is an enlarged perspective view of a removable die 24, shown in FIG. 1;

FIG. 4 is an enlarged view taken substantially along line 4—4 of FIG. 2;

FIG. 5 is an enlarged cross-sectional view taken substantially along line 5—5 of FIG. 2, showing details of land channels 32,34 and flow convergence of a core stream with side streams at a place of convergence 134;

FIG. 6 is an enlarged view taken substantially along line 6—6 of FIG. 2, showing details of edge seam-forming channels 150,154 and flow convergence at a locus of convergence 152 of streams exiting these channels;

BEST MODE FOR CARRYING OUT THE INVENTION

As explained above, the present invention is directed to an improved coextrusion apparatus and process. It is intended that this invention be primarily used for isolating heat-sensitive or corrosive thermoplastic materials such as polyvinylidene chloride, polyvinyl chloride, ethylene vinyl alcohol and acrylonitrile. Additionally, this invention, as a result of its core material-isolating feature, is useful for the coextrusion of an expensive core material.

Polyvinylidene chloride is a heat- and shear-sensitive resin. Therefore, resin contact with the metal body of a coextrusion apparatus, and residence time should be limited. Otherwise, resin degradation is accelerated.

Figure 1:
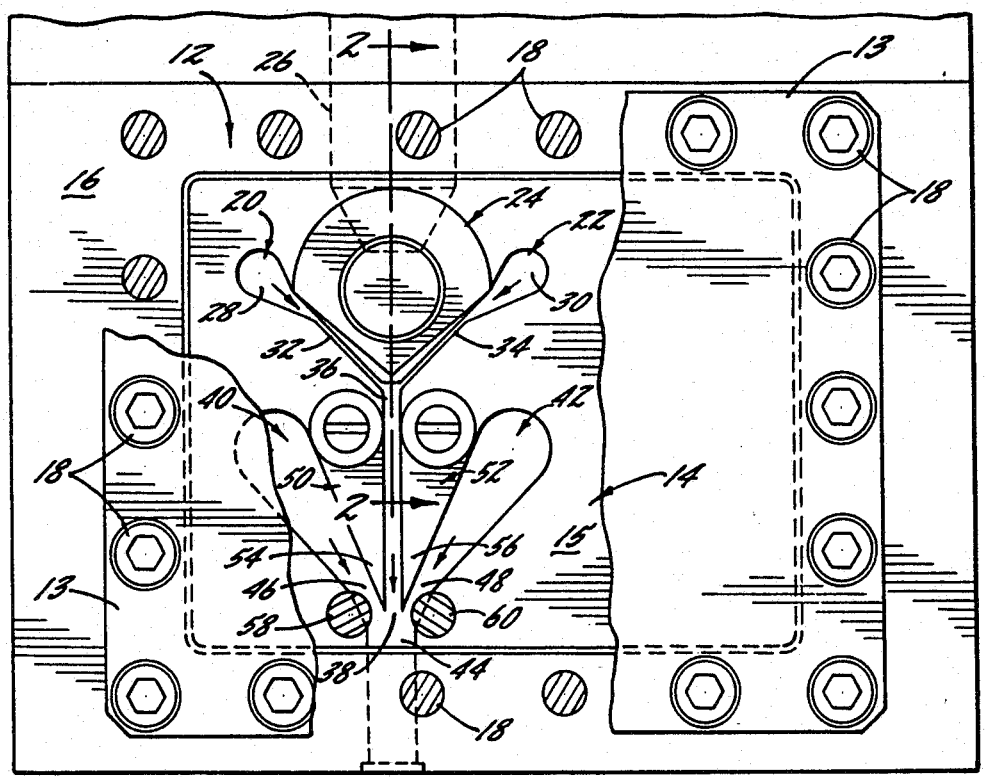
FIG. 1 is a plan view with portions of a housing plug 13 removed, of a preferred embodiment of an improved coextrusion apparatus in accordance with the present invention.

Referring to FIG. 1, a preferred embodiment of a coextrusion apparatus 10 in accordance with the present invention is shown. The apparatus is depicted in a feedblock 12. A portion of a housing plug 13 is broken away to expose the apparatus to view. Also revealed is a recess 14 having a bottom wall 15, in a main body 16 of the feedblock. The housing plug is bolted to the main body of the feedblock by bolts 18.

In the main body of feedblock 12 are upstream flow channels 20,22. Disposed between these flow channels is a die 24, which is advantageously easily removable. Die 24 is fed by a feed tube 26. Feed channels for the upstream flow channels are not shown.

Each upstream flow channel includes a manifold 28,30 and a land channel 32,34, as shown. Transverse flow of a stream occurs in a manifold. The diminished cross-section of a land channel vis-a-vis its manifold, restricts flow from the manifold to a center flow channel 36.

Further downstream, center flow channel 36 converges at a point of convergence 38, with downstream flow channels 40,42 to form an exit flow passage 44. Feed channels for the downstream flow channels are not shown. Flow channels 40,42 include tapered flow-restriction channels 46,48, respectively.

Situated between flow channels 40 and 36, and between flow channels 36 and 42 are pivotably mounted, vane blades 50,52, as shown. Advantageously, the vane blades are adjustable for variably restricting flow from channels 40,42.

Near tips 54,56 of the vane blades are removably mounted distribution pins 58,60, which serve flow channels 40,42, respectively, as necessary.

Figure 2:
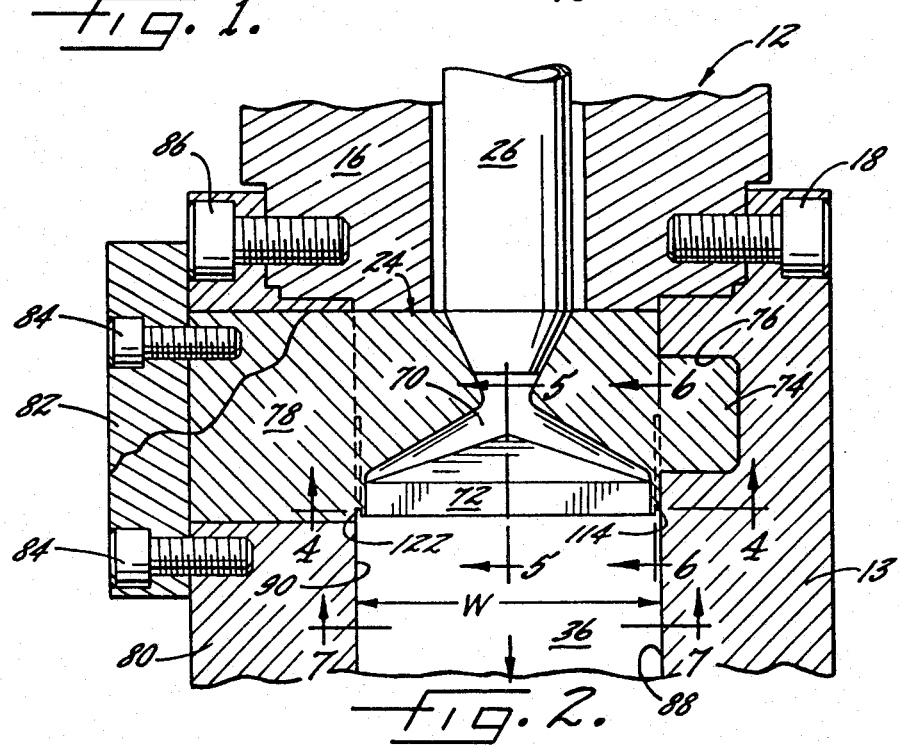
FIG. 2 is a cross-sectional view of the coextrusion apparatus of FIG. 1, taken along line 2—2 of FIG. 1.

Referring now to FIG. 2, removable die 24 has a streamlined passage that advantageously provides for streamlined flow and reduces residence time. The passage includes a manifold 70, preferably of the coathanger type, a preland channel 71, shown in FIG. 5, and a die exit or land channel 72, which suitably has parallel walls.

Transverse flow takes place in the die manifold. The length and gap of the die exit channel ensure uniform transverse distribution of a stream as it enters the die exit channel.

Unlike the vane blades which are adjustable, the die is preferably fixed in place as now described. A round shaft 74 at one end of the die is supported by a bearing surface 76, which is located in housing plug 13, and an opposite die end 78 is bolted to a housing plug 80 through a flange 82 by bolts 84.

By removal of bolts 84 and by grasping flange 82, the die can be withdrawn from the feedblock. Bolts 86 (only one shown) attach housing plug 80 to main body 16 of the feedblock.

Inner walls 88,90 of housing plugs 13,80, respectively, define a width W for flow channels 36,40, 42,44. This width is shown for center flow channel 36. Typically, in the case of a feedblock, this width is 4".

With reference to FIG. 3, external features of the removable die are plainly seen, including an exit slot 100 of rectangular cross-section. When a resin having a high resistance to flow relative to the other resins used, is the core stream, it may be advantageous to provide a heavy edge flow of the high resistance resin from the die so as to achieve uniform lateral distribution through a downstream die manifold. A heavy edge flow may be achieved using an exit slot with a relatively larger gap at its ends than between its ends. Polyvinylidene chloride exemplifies a high resistance resin.

Also shown in FIG. 3 are major faces 102,104, and at the round shaft end of the die, end wall 106, which have been undercut to form undercut wall 108 and undercut faces 110,112. Undercut faces 110,112 intersect upstream of exit slot 100 to form a point 114.

Referring now also to FIG. 4, similarly, at opposite die end 78, major faces 102,104 have been undercut to form undercut wall 116 and undercut faces 118,120, which intersect upstream of exit slot 100 to form a point 122. Also at die end 78, is a wall 124, a portion of which was exposed when undercut wall 116 was formed. Wall 124 and inner walls 88,90 of housing plugs 13,80 define the width of flow channels 20,22, which is the same as width W, shown in FIG. 2.

With reference to FIG. 5, a feedblock wall 130 and major die face 102 define a gap G of land channel 32. The land channel should have a gap and a length sufficient to restrict flow such than an adequate back pressure is produced in manifold 28 to provide uniform transverse distribution of a stream entering the land channel.

The land channel should have a gap that matches the flow velocity of a stream exiting therefrom, to that of a stream exiting die 24, thereby promoting laminar flow at convergence. Assuming a constant volume output from the land channel, a relatively larger gap permits a relatively decreased velocity of the exiting stream, whereas a relatively smaller gap produces a relatively increased velocity of the exiting stream.

The length of the land channel should also ensure that a uniform velocity profile of the exiting stream is established prior to convergence with the stream exiting die 24.

The land channel walls are suitably parallel. However, the walls could be tapered in the direction of flow.

A feedblock wall 132 and major die face 104 define the gap of land channel 34. The gap and length of this land channel are controlled by considerations similar to those set forth for land channel 32. Accordingly, land channel 34 is typically identical to land channel 32.

Furthermore, it will be understood that similar considerations govern the gap and length of die exit channel 72 of die 24. However, an important distinction is that the output from die 24 is typically set first, and the land channel dimensions are chosen based upon the die output.

At a place of convergence 134, land channels 32,34 converge with exit channel 72 of the removable die to form main channel 36. The angle of convergence between either land channel and main channel 36 is suitably about 45°.

Referring again to FIG. 4, die faces 102,104 have a width U that defines the width of land channels 32,34. Stated differently, with reference also to FIG. 3, edges 136,138 of major face 102 define ends of land channel 32, and edges 140,142 of major face 104 define ends of land channel 34.

With reference to FIG. 6, flow channel 20 includes an edge seam-forming channel 150, which has a gap D, which is defined by feedblock wall 130 and undercut face 110. Channel 150 intersects at a locus 152 with an edge seam-forming channel 154 of flow channel 22. Gap D, which increases in the flow-direction of channel 20, is greater than gap G, shown in FIG. 5.

Channel 154 has a gap defined by feedblock wal 132 and undercut face 112. This gap is typically identical to that of edge seam-forming channel 150. Thus, both these channels have an inverse taper in the flow-direction.

As can be seen by comparison of FIGS. 5 and 6, convergence locus 152 of edge seam-forming channels 150,154, is upstream of place of convergence 134. This assures that an integral edge seam is formed prior to exit of a core stream from the die exit channel and convergence of the core stream with streams exiting from channels 20,22.

Referring again to FIG. 4, channels 150,154 have a width V defined by inner wall 88 of housing plug 13 and undercut wall 108. At opposite die end 78, undercut wall 116 and undercut faces 118,120 cooperate with wall 124 of die end 78 to form edge seam-forming channels 156,158 of flow channels 20,22, respectively. These channels intersect at a convergence locus (not shown), which is suitably identical to the location of convergence locus 152 relative to that of place of convergence 134.

Suitably, edge seam-forming channels 156,158 have a gap and a width the same as that of edge seam-forming channels 150,154. The width of channels 156,158, which is shown as V, is defined by undercut wall 116 and wall 124.

The rigid mounting of die 24 and the cooperation of feedblock walls 130,132 with the die faces to form land channels 32,34, provides a fixed geometry to the land channels. Accordingly, a constant proportionality between the land channel output and the die output can be maintained.

As can readily be determined, width W of channels 20,22,36, shown in FIG. 2 for center channel 36, equals width U of the land channels plus widths V,V of the edge seam-forming channels. Illustratively, when width W is 4", width V is 1/64". A greater width V may be chosen if a wider edge is desired.

An advantage of removability of die 24 is that the die may be replaced with an interchangeable die having a different width and/or gap for exit slot 100, or that provides a different width for the edge convergence channels.

As explained, flow channels 20,22 include land channels 32,34 and edge seam-forming channels 150,154,156,158. Thus, side streams passing through flow channels 20,22 converge upstream of place of convergence 134, to form seamed edges prior to a core stream exiting through die exit slot 100. As a result, the core stream is sandwiched between the streams exiting from channels 20,22, and lateral leakage of the core stream is prevented.

Operation of coextrusion apparatus 10 will now be described for a polyvinylidene chloride core stream. Any other desired, suitable material could be used as the core stream, but the material chosen will typically be a heat-sensitive, corrosive or expensive thermoplastic material.

The side streams for sandwiching the core stream, are ethylene vinyl acetate, an exemplary thermoplastic adhesive. Other types of suitable material, adhesive or non-adhesive, could be used to sandwich a core stream, with the selection of this material usually depending upon the core material chosen.

Barrier die 24, made of nickel and having a 3 15/16"×0.115" exit slot, is selected for use and inserted into feedblock 12, which has a flow channel width W of 4". Channel 72 of the barrier die is 0.25" in length.

The barrier die is selected to provide a land channel gap G of 0.055". This gap matches the output velocity of the adhesive streams from the land channels, to the output velocity of the core stream from the barrier die. Factors influencing the gap selection include the flow rate and the shear stress at the land channel walls. The length of land channels 32,34 is 1".

The edge seam-forming channels of the assembled coextrusion apparatus have a width V of 1/64". Points 114,116 are located approximately 1/32" upstream of die exit orifice 100. Gap D of the edge seam-forming channels is determined by the location of points 114,116.

In operation, molten streams of an ethylene vinyl acetate adhesive enter flow channels 20,22, undergo transverse flow in feedblock manifolds 28,30, and enter land channels 32,34 and edge seam-forming channels 150,154,156, 158. At the loci of convergence of channels 150,154 and 156,158, streams of the adhesive converge to form integrally seamed edges.

Simultaneously, a molten stream of polyvinylidene chloride enters barrier die 24 through feed tube 26, also made of nickel, undergoes transverse flow in die manifold 70, passes through die exit channel 72, and exits the die through slot 100. At convergence place 134, the adhesive streams exiting from land channels 32,34 and the polyvinylidene chloride stream converge.

Figure 7:
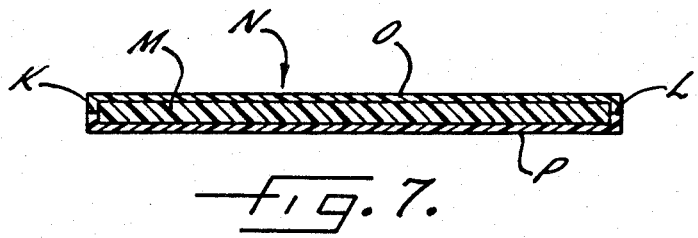
FIG. 7 is an enlarged sectional view of a composite stream N, taken substantially along line 7—7 of FIG. 2.

The polyvinylidene chloride core stream is isolated within contiguous layers of the adhesive. As shown in FIG. 7, a melt-laminate N has a core layer M of polyvinylidene chloride sandwiched between an adjacent layer O of adhesive and an adjacent layer P of adhesive. Seam lines K,L reveal the convergence of layers O,P to form the edges of the sandwich. The edge seam-forming channels assure that the melt-laminate has a uniform edge width.

At point of convergence 38, melt-laminate N converges with a molten thermoplastic such as an olefinic polymer, which passes through flow channel 40, and with another molten thermoplastic such as a styrenic polymer, which passes through flow channel 42, to form a five layer melt-laminate having the following layer sequence: a top layer of olefinic polymer, an ethylene vinyl acetate adhesive layer, a polyvinylidene chloride core layer, an ethylene vinyl acetate adhesive layer, and a lower layer of styrenic polymer. It will be understood that any suitable material other than styrenic and olefinic polymers, could be chosen, with the selection of the material generally being determined by the desired properties of the laminate product.

After the melt-laminate has been passed through a downstream die manifold, a laminate product is obtained. Inspection shows the product to be free of core layer degradation.

Figure 8:
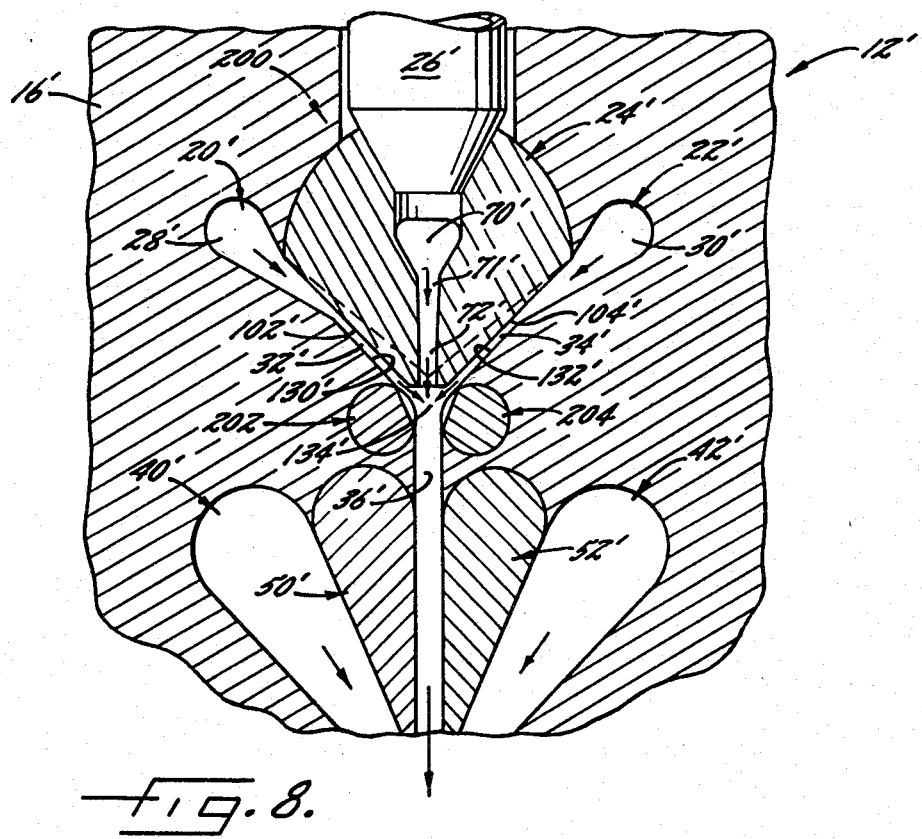
FIG. 8 is a cross-sectional view substantially identical to that of FIG. 5, of another preferred embodiment of a coextrusion apparatus in accordance with the present invention.

Referring now to FIG. 8, another preferred coextrusion apparatus 200 in accordance with the present invention, is shown. In this Figure, identical numbers distinguished by an apostrophe, represent parts identical to those of the foregoing embodiment. Thus, as can readily be seen, this embodiment is identical to apparatus 10 except for adjustable distribution pins 202,204, which are located proximate to a place of convergence 134' of a core stream and side streams. Pins 202,204, which are preferably removably mounted, are advantageously externally accessible for adjustment.

Figure 9:
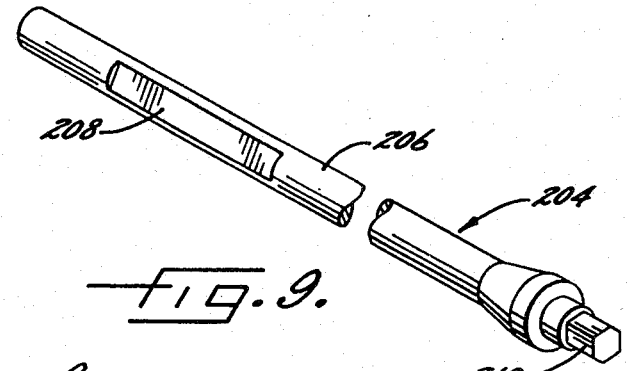
FIG. 9 is a perspective view of a distribution pin 204 of FIG. 8.

With reference to FIG. 9, a shaft 206 of distribution pin 204 has an elongated groove 208 located about midway down the shaft length. At an end of the pin is an extension 210 for adjustably rotating the pin to either expose groove 208 to, or conceal groove 208 from, the stream exiting from a flow channel 22'.

In use, when groove 208 of distribution pin 204 is exposed, there is a relatively lower resistance to flow in the vicinity of the groove than on either side of the groove where a molten stream is encountered by the full diameter of the pin shaft. In contrast, when groove 208 is concealed from the stream, the resistance to flow is uniform along the entire pin shaft. Thus, the pin is able to influence the stream profile based upon pressure displacement.

The features and function of distribution pin 202 are identical to pin 204. As a result, it is possible to influence the profile of the converging streams, including the edge flow. For instance, by reducing center resistance, the amount of edge flow of a side stream is reduced; whereas by increasing center resistance, the amount of edge flow of the side stream is increased. This capability provides additional flexibility.

Moreover, adjustable distribution pins may through profiling, influence the efficient use of edge seam-forming channels, which typically have an inverse taper in the flow-direction. An inverse taper provides a low pressure channel. As a result, any profiling will have a relatively greater influence on edge flow than on flow through a land channel.

Furthermore, this profiling capability combined with the removability of the distribution pins, enables replacement, if needed, by pins that can provide heavy center flow of a core stream. It will be understood that pins 202,204 provide heavy edge flow of a core stream.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

Industrial Applicability

This invention is useful for the isolation of a heat-sensitive, corrosive or expensive material as a core layer within a melt-laminate.

I claim:

1. A coextrusion apparatus comprising
   (a) a main body comprising a first flow channel and a second flow channel, each of which comprises a land channel;
   (b) a die body disposed between said first flow channel and second flow channel, said die body comprising a transverse flow-providing chamber and, in fluid communication therewith, an exit channel; wherein said main body has a first wall which cooperates with a first face of said die body to form the land channel of said first flow channel, and has a second wall which cooperates with a second face of said die body to form the land channel of said second flow channel; and wherein each land channel has a width less than that of its respective flow channel; and
   (c) at each edge of, and in fluid communication with, each of said land channels, an edge seam-forming channel, pairs of which each converge at a locus of convergence located upstream of a place of convergence of said land channels and said exit channel of said die.

2. The coextension apparatus of claim 1, wherein a feedback comprises said main body.

3. The coextension apparatus of claim 1, wherein a pair of converging edge seam-forming channels at an end of said die body is formed by cooperation of said first main body wall and a first undercut face of said die body, and by cooperation of said second main body wall and a second undercut face of said die body.

4. The coextension apparatus of claim 1, wherein said edge seam-forming channels inversely taper in the flow-direction, to the respective locus of convergence.

5. The coextrusion apparatus of claim 1, wherein said die body is removably mounted.

6. The coextrusion apparatus of claim 1, wherein said die body is made of nickel.

7. A coextrusion apparatus comprising
(a) a main body comprising a first flow channel and a second flow channel, each of which comprises a land channel;
(b) a die body disposed between said first flow channel and second flow channel, said die body comprising a transverse flow-providing chamber and, in fluid communication therewith, an exit channel; wherein said main body has a first wall which cooperates with a first face of said die body to form the land channel of said first flow channel, and has a second wall which cooperates with a second face of said die body to form the land channel of said second flow channel; and wherein each land channel has a width less than that of its respective flow channel;
(c) at each edge of, and in fluid communication with, each of said land channels, an edge seam-forming channel, pairs of which each converge at a locus of convergence located upstream of a place of convergence of said land channels and said exit channel of said die; and
(d) adjustable distribution pin means for profiling, located proximate to said place of convergence.

8. The coextrusion apparatus of claim 7, wherein a feedblock comprises said main body.

9. The coextrusion apparatus of claim 7, wherein a pair of converging edge seam-forming channels at an end of said die body is formed by cooperation of said first main body wall and a first undercut face of said die body, and by cooperation of said second main body wall and a second undercut face of said die body.

10. The coextrusion apparatus of claim 7, wherein said edge seam-forming channels inversely taper in the flow-direction, to the respective locus of convergence.

11. The coextrusion apparatus of claim 7, wherein said die body is removably mounted.

12. The coextrusion apparatus of claim 7, wherein said means for profiling is removably mounted.

13. The coextrusion apparatus of claim 7, wherein said die body is made of nickel.

14. A coextrusion process for sandwiching a core stream between a first stream and a second stream, said process comprising transversely spreading a core stream to a certain width, and a first stream and a second stream each to a width greater than said certain width; thereafter converging edges of said first stream with edges of said second stream, to form seamed edges that prevent lateral leakage of said core stream; and then converging said core stream, said first stream and said second stream to form a melt-laminate sandwich.

15. The coextrusion process of claim 14, further comprising subjecting a portion of said first stream to a relatively lower resistance to flow than said first stream otherwise encounters.

16. The coextrusion process of claim 14, further comprising changing the edge flow of said first stream by subjecting a portion of said first stream to a relatively lower resistance to flow than said first stream otherwise encounters.

17. The coextrusion process of claim 14, further comprising expanding in the flow-direction, the cross-section of each of said edges of said first stream and the cross-section of each of said edges of said second stream prior to converging said edges.

* * * * *